June 17, 1930.
A. WASCHNACK
TELEPHONE SYSTEM
Re. 17,703
Original Filed May 22, 1924
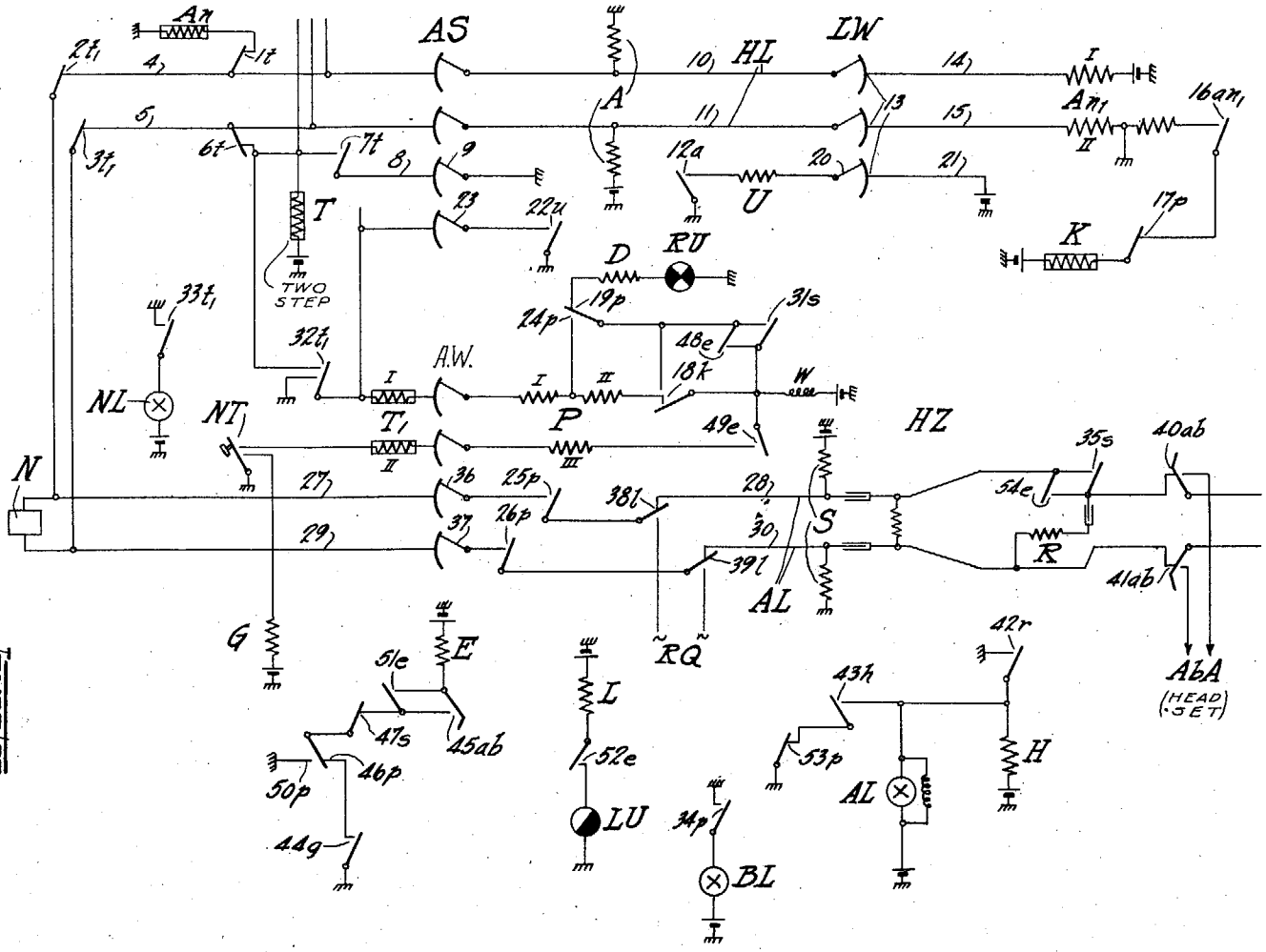
Inventor
Adolf Waschnack
Chas. W. Bandy Atty.

Reissued June 17, 1930 Re. 17,703

UNITED STATES PATENT OFFICE

ADOLF WASCHNACK, OF NEU FINKENKRUG, NEAR BERLIN, GERMANY, ASSIGNOR TO SIEMENS & HALSKE AKTIENGESELLSCHAFT, WERNERWERK, OF SIEMENSSTADT, NEAR BERLIN, GERMANY

TELEPHONE SYSTEM

Original No. 1,639,445, dated August 16, 1927, Serial No. 714,998, filed May 22, 1924, and in Germany September 20, 1923. Application for reissue filed May 11, 1929. Serial No. 362,445.

The invention relates to a circuit arrangement for private branch exchanges with automatic working, in which local and main exchange calls are set up over separate connecting devices.

The invention consists in that main exchange calls are established by first setting on a particular contact the switches used for local calls and then over this contact operating further switching devices, which mark the calling line in the bank of the switches associated with the exchange lines and start up the switch of a free exchange line in order to set it on the marked contact.

The drawing shows one method of carrying out the invention and for the sake of clearness, all parts that do not form part of the invention have been omitted.

An extension station N of a private branch exchange HZ can at will set up a local connection over lines such as HL used only for local calls or an outside connection over lines such as AL used only for main exchange calls. The starting up of a switch such as AW used for exchange calls may be effected over the lines used for local calls and over the connecting devices such as the local switches AS and LW. The starting up of a main exchange switch and its setting on a calling line is dependent on the switch LW being set on a particular contact of its bank, whereby the relays A*n*1 and K are operated. Thereupon the rotary magnet D of a free main exchange switch is connected up over a contact of the relay K and the switch wipers are moved on step by step by an interrupter until the calling line is reached, this having been marked by potential applied over the contact of a relay U, which was also energized when the switch LW was set on the particular contact. The setting of the main exchange switch having been completed, a relay T1, which is then connected up disconnects the leads used for the local traffic and employed for initiating the exchange call; hence the connecting devices AS and LW are released and are again rendered available for the local traffic. The relay S is energized by feed current passing over the subscriber's line and extends the call to the main exchange. The incoming calls are handled in known manner at the P. B. X. operator's position. In order to deal with an incoming call, the operator connects her head set A*b*A to the line and by means of the key NT associated with the wanted station, she marks the wanted line and starts up an idle exchange switch, for example AW, which is then set on the marked line.

The method of operating is as follows:

Assume for example that a subscriber of the private branch exchange HZ, for instance at the extension station N, wishes to make an exchange call and for this purpose takes down his receiver. The following circuit is thereupon completed: earth, winding of the relay A*n*, contact 1*t*, lead 4, contact 2*t*1, extension station N, contact 3*t*1, lead 5, contact 6*t*, winding of the relay T, battery, earth. Relay T, which is a two step relay, energizes part way and closes its contact 7*t* in order to mark the calling line in the bank of the call seekers such as AS. The energizing of the relay A*n* in this circuit causes an idle call seeker, for instance AS, to be started up in known manner and position on the calling line 4, 5. After the call seeker AS has reached the calling line, the relay T becomes fully energized due to current supplied over test wiper 9 in known manner, opens its contacts 1*t* and 6*t*, disconnects the relay A*n* which stops the switch, and at 7*t* is itself held up to hold the call seeker in the set position. The positioning of AS also caused the relay A to be energized over the leads 10, 11, thereby closing its contact 12*a*. The calling subscriber now operates his number dial (not shown), thereby positioning the final selector LW on the selected contact, for instance 13, in its bank. The following circuit is then established: earth, battery, winding I of relay A*n*1, lead 14, contact 13, wiper of LW, lead 10, wiper of AS, lead 4, contact 2*t*1, extension station N, contact 3*t*1, lead 5, wiper of AS, lead 11, wiper of LW, lead 15, winding II of the relay A*n*1, earth. The relay A*n*1 operates in this circuit and at its contact 16*an*1 it closes a circuit for the relay K: earth, winding III of A*n*1, contact 16*an*1, back contact 17*p*, winding of K, battery, earth. The relay K operates and at its contact 18*k* it closes the circuit of the rotary magnet D of an idle main exchange switch, for example AW: earth, relay interrupter RU, rotary magnet D, back contact 19*p*, contact 18*k*, resistance W, battery, earth. The positioning of LW on the particular contact in its bank also closed the following circuit for the relay U: earth, front contact 12*a*, winding of the relay U, wiper 20 of LW, contact 13, lead 21, battery, earth. By closing its contact 22*u*, the relay U applied earth to the wiper 23 of the switch AS. The exchange switch AW is thus started up and as soon as the calling line which is marked by a special potential, has been reached, the switch AW is stopped, because the test relay P then operates and at the contact 24*p* disconnects the rotary magnet D. The circuit of the test relay P which includes also the cut-off relay T1, extends as follows: earth, battery, resistance W, contact 18*k*, windings II and I of P, wiper of AW, winding I of the slow acting relay T1, wiper 23 of AS, contact 22*u*, earth. The relay P also closes its contacts 25*p*, 26*p*, thereby energizing the relay S owing to the loop completed over the speaking leads 27, 28 and 29, 30. The relay S closes its contacts 31*s* and 35*s*. The relay T1, which was likewise energized in the test circuit, closes its contact 32*t*1, thereby establishing a locking circuit for T1 and P, which extends over the contacts 32*t*1, 24*p*, 31*s*. By the energizing of T1, the contacts 2*t*1 and 3*t*1 were also opened, thereby the switches AS and LW used for the local P. B. X. traffic are released and the opening of the contact 17*p* also effects the release of the relays A*n*1 and K. After the contact 22*u* has been opened, the test relay P and the cut off relay T1 are maintained energized over the before mentioned holding circuit. The calling subscriber's extension station N is marked engaged to a final selector set on this line, because T is maintained energized over the contact 32*t*1. At the private branch exchange the calling subscriber's lamp NL is connected up over the contact 33*t*1 of T1 (earth, contact 33*t*1, lamp NL, battery, earth) and the lamp BL of the exchange line AL taken into use is connected up over the contact 34*p* of P, thus the P. B. X. operator is notified that these lines are engaged. The route over the local connecting devices (AS, LW) having been disconnected by the cut off relay T1, the circuit now extends from the extension station N over the leads 29, 27, wipers 36, 37, contacts 25*p*, 26*p*, back contacts 381, 391, leads 28, 30, contact 35*s*, contacts 40*ab* and 41*ab* of the operator's listening key at the private branch exchange HZ direct to the main exchange.

Incoming calls from the main exchange can be dealt with by the P. B. X. operator at HZ either in known manner with plug and cord or over selecting devices as shown in the example and hereafter described. A call incoming at the private branch exchange HZ from the main exchange energizes the line relay R, which by closing its contact 42*r*, establishes a circuit for the relay H: earth, contact 42*r*, winding of H, battery, earth and also for the line lamp AL. H operates and by closing its contact 43*h* completes a locking circuit over back contact 53*p*. The P. B. X. operator, by operating her listening key contacts 40*ab*, 41*ab*, connects her instrument A*b*A to the calling line and ascertains that a connection is desired with the extension station N. The operator then marks the line of the wanted extension station by depressing the key NT associated with that station. Thereby also the relay G is energized: earth, extension station key NT, relay G, battery, earth. Thereupon over the contact 44*g* and over the contact 45*ab* of the speaking key a circuit is closed for the relay E: earth, contact 44*g*, back contact 46*p*, back contact 47*s*, contact 45*ab*, winding of E, battery, earth. E closes its contact 54*e* thereby switching through the line and by closing its contact 48*e* it connects up the rotary magnet of an idle exchange switch, for example AW: earth, relay interrupter RU, rotary magnet D, back contact 19*p*, contact 48*e*, resistance W, battery, earth. This switch then rotates its wipers until they find the line marked by the special potential, whereupon the test relay P is operated over the contact 49*e*, which was likewise closed: earth, extension station key NT, winding II of T1, wiper of AW, winding III of P, contact 49*e*, resistance W, battery, earth. Contact 19*p* is thus opened and interrupts the circuit of the rotary magnet D of the switch AW. The cut off relay T1 is also energized in the test circuit and by closing its contact 32*t*1 establishes the following holding circuit for itself and for the test relay P: earth, contact 32*t*1, winding I of T1, wiper of AW, winding I of P, contact 24*p*, contact 48*e*, resistance W, battery, earth. The extension station key NT can be released after P has operated, because the circuit for E is maintained over the earthed contact 50*p* and the contact 51*e* after the contact 44*g* has been opened. T1 also disconnects the extension station N from the local P. B. X. apparatus and at the contact 32*t*1 it connects up the relay T, which marks the extension line engaged. When E operated a circuit was also established for the relay L: earth, relay interrupter LU, contact 52*e*, winding of L, battery, earth. By the alternate opening and closing of the contacts 38*l*, 39*l*, ringing current is sent to the extension station N over the closed contacts 25*p*, 26*p*, wipers 36, 37 of AW, leads 27, 29. When the called extension station N answers, its feeding relay S operates and opens the contact 47*s*, thereby causing the release of the relay E and hence also of the relay L. The relay L upon releasing disconnects the source of ringing current RQ from the line. After the contacts 48*e* and 49*e* have opened, the circuit of the cut off relay T1 and of the test relay P is maintained over the contact 31*s*. The line lamp AL is disconnected when the contact 53*p* is opened. The extension station N and the exchange line AL are marked engaged by $33t_1$ and 34*p*. At the end of the conversation the hanging up of the receiver at the extension station N de-energizes the feeding relay S, whereupon the opening of the contact 31*s* interrupts the circuit of T1 and P and causes the apparatus used for the call to return to its normal condition.

What is claimed is:

1. In a private branch exchange, a calling line, a finder switch, a connector switch, local telephone lines and a special line terminating in the banks of said connector switch, means operated by the calling line to cause said finder to find said calling line, means operated by said calling line to operate said connector to connect with one of said local lines or said special line, a second finder switch terminating said special line, an outgoing trunk to the main exchange, and means responsive to the connection of said connector with said special line to operate said second finder to connect the calling line with said trunk.

2. In a private branch exchange, a calling line, a finder switch, a connector switch, local telephone lines and a special line terminating in the banks of said connector switch, means operated by the calling line to cause said finder to find said calling line, means operated by said calling line to operate said connector to connect with one of said local lines or said special line, a second finder switch, an outgoing trunk to the main exchange, means responsive to the connection of said connector with said special line to operate said second finder to connect the calling line with said trunk, and means controlled by the operation of the second finder switch for releasing said first finder and connector switch.

3. In a private branch exchange, an outgoing trunk to the main exchange, a finder switch associated with said trunk, a called line, an operator's position, means controlled by an operator for operating said finder to connect said line with said trunk, a connector switch, local lines and a special call terminal terminating in the banks of said connector, means for operating said connector when said line is a calling line to connect said line with said terminal, and means responsive to the connection of said line with said terminal for operating said finder to connect said line with said trunk.

4. In a private branch exchange, an outgoing trunk to the main exchange, a finder switch associated with said trunk, a called line, an operator's position, means controlled by an operator for operating said finder to connect said line with said trunk, a connector switch, local lines and a special call terminal terminating in the banks of said connector, means for operating said connector when said line is a calling line to connect said line with said terminal, means responsive to the connection of said line with said terminal for operating said finder to connect said line with said trunk, and means responsive to the connection of said line with said trunk for releasing said connector.

5. In a telephone system, a calling line, a finder switch having access to said line, a directive switch, a non-numerical switch responsive to the initiation of the call for extending the same to said directive switch, and means responsive to a predetermined operation of said directive switch for starting said finder switch independent of the calling line whereby said finder switch hunts for and connects with said calling line.

6. In a telephone system, a calling line, a finder switch having access to said line, a directive switch, a non-numerical switch responsive to the initiation of a call on the calling line for extending the same to said directive switch, means responsive to a predetermined operation of said directive switch for starting said finder switch to hunt for and find the calling line, and means controlled by said finder switch when it finds the calling line for releasing the other switches.

7. In a telephone system comprising a main exchange and a branch exchange, subscribers' lines in the branch exchange, a two-way trunk interconnecting the main exchange and the branch exchange, a finder switch individual to said trunk and having access to said lines, and means for operating said finder to automatically hunt for and connect a line with said trunk when the line is either calling or being called.

8. In a telephone system, subscribers' lines, a two-way trunk, a finder switch individual to said trunk and having access to said lines, means for operating said finder to connect a line with said trunk when the line is either calling or being called, means controlled over the line when the same is calling for marking the line as a calling line in the bank of said finder, and means controlled by an operator when the line is being called for marking the line as calling in the bank of said finder.

9. In a telephone system, comprising a plurality of exchanges, subscribers' lines in one exchange, a two-way trunk extending from said one exchange to another exchange, a finder switch individual to said trunk and having access to said lines, means for operating said finder to connect a line with said trunk when the line is either calling or being called, and means operable independent of control over a line when the same is being called for marking such line as calling in the bank of said finder.

10. In a telephone system, a calling line, two finder switches having access to said line, means for starting the first finder responsive to the initiation of the call on said calling line, an automatic switch connected up by said first finder, and means independent of said calling line for starting said second finder responsive to the operation of said switch whereby said second finder automatically hunts for and connects with said calling line.

11. In a telephone system, a calling line, two finder switches having access to said line, means for starting the first finder responsive to the initiation of the call on the said calling line, and means responsive to a series of impulses transmitted from the calling line through said first finder after the same has found the calling line for starting the second finder to find the calling line, said last means including a starting circuit for said second finder independent of the calling line.

12. In a telephone system, a calling line, two finder switches having access to said line, means for starting the first finder responsive to the initiation of the call on the said calling line, an automatic switch connected up by said first finder, means for starting said second finder to find the calling line responsive to the operation of said switch, and means responsive to the second finder connecting with the calling line for releasing the first finder.

13. In a telephone system, a calling line, two finder switches having access to said line, means for starting the first finder responsive to the initiation of the call on the said calling line, means responsive to a series of impulses transmitted from the calling line through said first finder after the same has found the calling line for starting the said second finder to find the calling line, and means responsive to the second finder connecting with the calling line for releasing the first finder.

14. In a telephone system, subscribers' lines, a finder switch in which said lines terminate, a trunk, means responsive to a call on one of said lines for operating said finder to extend such line to said trunk, an individual key for each line, a key for said trunk, and means responsive to the actuation of one of said line keys and said trunk key for causing the operation of the finder to extend said trunk to the corresponding line as a called line.

15. In a telephone system, subscribers' lines, a finder switch in which said lines terminate, a trunk terminating in the brushes of said finder switch, means responsive to a call on one of said lines for operating said finder to extend such line to the trunk, an operator's position, individual keys at said position for each of said lines, a key for said trunk at the operator's position, and means responsive to the joint actuation by the operator of one of said line keys and said trunk key for causing the operation of the finder switch to extend said trunk to the corresponding line as a called line.

16. In a telephone system, subscribers' lines, a line finder switch in which said lines terminate, brushes on said switch, a trunk circuit for completing incoming and outgoing calls, means for operating said switch to connect said trunk to one of said lines, an operator's position, keys at said position, and two different test circuits each leading through different brushes in said finder switch dependent upon whether a subscriber's line is calling or being called, one of said test circuits being under the control of the subscriber and the other under the control of said keys at the operator's position.

Signed by me at Berlin-Siemensstadt, Germany, this 15th day of April, 1929.

ADOLF WASCHNACK.